United States Patent [19]

Violette

[11] Patent Number: 5,074,754

[45] Date of Patent: Dec. 24, 1991

[54] ROTOR BLADE RETENTION SYSTEM

[75] Inventor: John A. Violette, Granby, Conn.

[73] Assignee: United Technologies Corporation, Hartford, Conn.

[21] Appl. No.: 513,136

[22] Filed: Apr. 23, 1990

[51] Int. Cl.$^5$ .............................................. F01D 5/32
[52] U.S. Cl. ............................... 416/248; 416/204 A; 416/219 R; 416/220 R; 403/381
[58] Field of Search .......... 416/204 R A, 207, 219 R, 416/220 R, 248, 500; 403/381, 374

[56] References Cited

U.S. PATENT DOCUMENTS

| | | | |
|---|---|---|---|
| 889,622 | 9/1908 | Rotter | 416/220 R |
| 952,317 | 3/1910 | Eyermann | 416/221 |
| 1,470,499 | 10/1923 | Steenstrup | 29/889.21 |
| 2,331,555 | 10/1943 | Jostich, Jr. et al. | 403/381 |
| 4,057,294 | 11/1977 | Krekeler | 403/381 |
| 4,108,571 | 8/1978 | Mawson | 416/221 |
| 4,349,318 | 9/1982 | Libertini et al. | 416/220 |
| 4,480,958 | 11/1984 | Schlechtweg | 416/220 |

FOREIGN PATENT DOCUMENTS

| | | | |
|---|---|---|---|
| 809689 | 8/1951 | Fed. Rep. of Germany | 403/381 |
| 145297 | 6/1954 | Netherlands | 403/381 |
| 148814 | 7/1921 | United Kingdom | 416/221 |

Primary Examiner—John T. Kwon
Attorney, Agent, or Firm—Marshall E. Rosenberg

[57] ABSTRACT

A retention system for a rotor blade (10) utilizes the combinatioin of a fixed retention flange (13) and a removable retention plate (16) with a closed-sided retention member (12). This system enables the rapid replacement or removal of the rotor blade (10) for inspection, maintenance, or replacement purposes without requiring removal of surrounding major engine components or structural members. The rotor blade (10) is installed in a retention member (12) contained in a rotatable hub (not shown) by inserting an outwardly extending portion (20) of a shaped blade root (22) of the rotor blade (10) below a radially-inwardly projecting shaped flange (13) peripherally disposed within the interior of the retention member's structure. A removable shaped retention plate (16), which is releasably secured to, and adapted to mate with, the retention member (12), then captures and secures another outwardly extending portion (21) of the shaped root of the rotor blade (10) with a releasable fastener (18). The shaped root (22) is secured within the retention member (16) without a direct bolted connection. Preloading the fastener (18) induces compressive loading among the system components (12, 16, 22), resulting in the attenuation or elimination of fretting and wear of their respective component surfaces (21, 22, 23, 24).

4 Claims, 1 Drawing Sheet

ROTOR BLADE RETENTION SYSTEM

DESCRIPTION

1. Field of the Invention

This invention relates generally to rotor blades, and more particularly to means for retaining rotor blades in rotary machine hubs.

2. Background of the Invention

Rotary machines contain rotor blades installed in rotor hubs in radial orientation. These blades typically operate at high speeds and in hostile environments. Properly designed rotor blades, and their retention systems, enable the long and safe operation of the rotary machine.

However, a variety of significant factors, such as contact with foreign objects, shock, vibration, and stress cycling can affect a rotor blade's service life. Another significant factor is the impacting of the airstream and possibly combustion by-products on the rotor blade, resulting in the imposition of large moments and shearing forces about and through the rotor blade's retention member. Yet another factor is the rotor blade's susceptibility to high frequency vibrations resulting from exposure to free-stream airflow distortions. This high frequency vibratory behavior is especially evident in unducted propulsor designs. Hence, periodic inspection, maintenance, and replacement of rotor blades may be necessary due to the effects of the rotary machine's working environment.

Current practice in the disassembly/reassembly of rotor blading requires a substantial amount of service time and expense due to the interlocking nature of rotor blades and their ancillary captivating structures, as is generally taught in the related art. Specifically, current rotor blade retention practice teaches the use of shaped blade roots which are installed in complementary shaped slots in the host rotor hub. Access to these slots requires removal of large portions of cowling, bulkheads, and the engine spinner. Likewise, reassembly of the rotary machine's blading and related machine and enclosure components requires a significant investment in time and expense.

SUMMARY OF THE INVENTION

Accordingly, it is an object of the present invention to provide an improved rotor blade retention system wherein the retention system may be readily disassembled/reassembled for inspection, maintenance, or replacement of the rotor blades contained therein.

It is yet another object of this invention to provide an improved rotor blade retention system wherein the retention system firmly captures and secures the rotor blades to the rotor hub.

It is a further object of this invention to provide a means for preloading a rotor blade's shaped root within its complementary shaped slot to prevent or reduce fretting and wear of both the rotor blade and its mating surfaces.

It is yet a further object of the present invention to provide a closed-sided retention member which resembles a continuous closed annulus which enhances the structural integrity of the new retention system. which enhances the structural integrity of the new retention system.

These and other objects will become apparent in the further course of this disclosure.

According to the present invention, a rotor blade's shaped root is inserted into a retention member contained within a rotor hub, wherein a portion of the shaped root is retained by a complementary shaped flange secured to the retention member's structure. A removable retention plate secures some or all of the remaining exposed portion of the blade root to the retention member with a releasable mechanical connection between the retention plate and the retention member. This mechanical connection is tightened to a predetermined level resulting in a preloading of the blade root against its captivating retention member, thus firmly securing the rotor blade to the retention member. When a bolted connection is used, the connection is torqued to the predetermined level.

This invention provides significant advantages over the related art. One such advantage is the direct accessibility to individual rotor blades as installed in a rotary machine without requiring disassembly of surrounding major engine components or structural members. Thus, an individual rotor blade in need of inspection, maintenance, or replacement can be readily and rapidly removed from its captivating rotor hub, resulting in enhanced field servicing and turn-around time.

An additional advantage of the present invention is the capability of preloading the rotor blade's shaped root within its retention member. By preloading the rotor blade, its motions or excursions from an optimal position are attenuated or curtailed, resulting in the reduction or prevention of fretting and wear of the installed rotor blade's shaped root and its complementary mating surfaces in and about the retention member.

A further advantage of the present invention is the minimization of distortion of the retention member caused by operational stressing. This is accomplished by utilizing the enhanced structural integrity offered by the closed-sided retention member whose sides comprise a continuous annulus. This system minimizes the bending distortion which typically occurs in related-art open-sided retention members.

Finally, this invention requires a relatively small packaging volume within a rotor hub, which is an important consideration in the design of propulsion units with a plurality of rotor blades.

DETAILED DISCLOSURE

Figure 1:
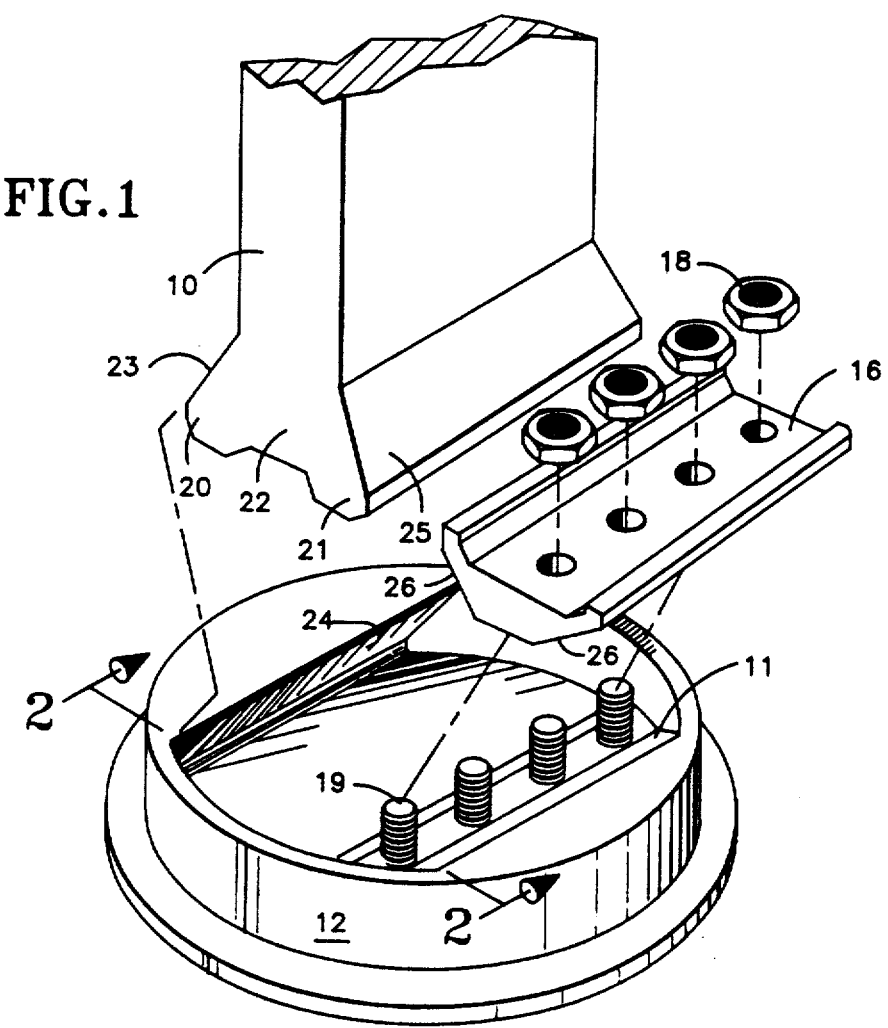
FIG. 1 illustrates the arrangement of a rotor blade in relation to its complementary shaped recess within a retention member, according to the present invention.

FIG. 1 diagrammatically represents a rotor blade 10 which is releasably connected to a closed-sided retention member 12. The retention member 12 is releasably affixed to a rotatable hub (not shown). As installed, the rotor blade 10 is oriented in a radially-outward direction in relation to the hub's axis of rotation (also not shown).

Figure 2:
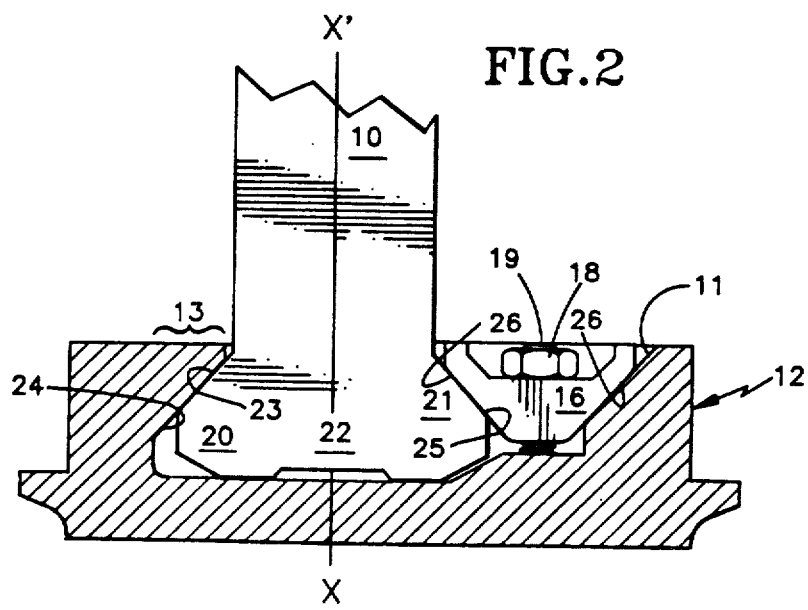
FIG. 2 is a sectional view of the retention system.

The shaped root 22 of the rotor blade 10 is retained within the closed-sided retention member 12 by a shaped flange 13 and a shaped retention plate 16, as shown in FIG. 2. The shaped flange 13 is disposed upon the interior peripheral walls of the retention member 12, the shaped flange 13 extending radially inward toward the spanwise axis x—x' of the rotor blade 10, the shaped flange 13 designed to capture and secure the shaped root 22. The shaped root 22 has outwardly extending portions 20, 21. Portion 20 is captured by the shaped flange 13, and portion 21 is captured and secured by the shaped retention plate 16. The spanwise axis x—x' of the rotor blade 10 is not necessarily coincidental with the spanwise axis of the retention member 12. The shaped flange 13 and the retention member 12 may be integral.

The shaped retention plate 16 captures and secures the outwardly extending portion 21 of the shaped root 22 to the retention member 12. The shaped retention plate 16 is then releasably secured to the retention member 12 with a fastener 18 which attaches to a stud 19. The shaped retention plate 16 and the shaped flange 13 are adapted to cooperatively receive and retain those portions 20, 21 of the shaped blade root 22. The shaped retention plate 16 may extend circumferentially relative to the spanwise axis x—x' of the rotor blade 10 and may touch the shaped surface 24 of the shaped flange 13.

The shaped root 22 of the rotor blade 10 is thus secured within the retention member 12 without a direct bolted connection. This is accomplished by utilizing the locking effect caused by the friction forces which occur between two pairs of contact surfaces 23, 24, 25, 26, under compression, in a wedged configuration. The contact surface 23 of outwardly extending portion 20 mates with the complimentary shaped surface 24 of the shaped flange 13. Likewise, the contact surface 25 of the outwardly extending portion 21 mates with the complimentary shaped surface 26 of the shaped retention plate 16. The resulting friction between these mating surfaces under an applied compression load, which is applied through the fastener 18 attached to the stud 19, keeps the surfaces from slipping when the rotor blade 10 or the retention member 12 is exposed to, for example, vibratory and fatigue loading. The required compression is dependent on factors such as anticipated loading, component composition, and the operating environment, among others.

The shaped retention plate 16, as shown in FIG. 1, has a shaped mating surface 26 which bears against the complimentary shaped outwardly extending portion 21 of the shaped root 22 and against an additional complimentary shaped internal surface 11 of the retention member 12. The internal surface 11 may be contiguous with surface 24.

Proper torquing of the releasable fastener 18 against the stud 19 will effectively preload the system by urging a lateral wedging action of the retention plate 16 against the shaped root 22 and the internal surfaces 11, 24 of the retention member 12. Preloading of the root section 22 against the retention member 12 may be accomplished by torquing the releasable fastener 18, resulting in the desirable establishment of a predetermined level of compressive stress between the root section 22 of the rotor blade 10 and the retention member 12 in which it is captured. This occurs when the joined components 12, 16, 22 are compressed in reaction to the applied tensile force component within the fastener 18. Preloading of the system also results in the attenuation or elimination of fretting and wear of the surfaces of the rotor blade 10, the surfaces of the shaped root 22 and its outwardly extending portions 20, 21 and those components 12, 13, 16 they bear against when assembled in the manner previously described. The necessary torque level of the fastener 18 is determined by the design and centrifugal loading of the rotary machine.

The rotor blade 10 can be exposed to a variety of significant forces. Direct aerodynamic forces during rotary operation are among these, and impose significant bending tensile and compressive stresses in the vicinity of the blade's root. The retention member 12 may be designed such that the majority of these loads are biased toward the flange 13, the retention plate 16, or distributed evenly between these two components 12, 16.

Further improvements and modifications of the invention herein disclosed will occur to those skilled in the respective arts and all such improvements and modifications are deemed to be within the scope of the invention as defined by the appended claims.

I claim:

1. A system for retaining a rotor blade with a shaped root end within a retention member disposed within a rotatable hub, the system comprising:

the retention member including a peripherally-disposed shaped flange extending radially inward relative to the span axis of the retained rotor blade, and a shaped retention plate having spanwisely inner and outer surfaces, wherein the radially-inwardly extending flange is adapted to receive a portion of the shaped blade root, the shaped retention plate and a shaped mating surface of the retention member adapted to cooperatively receive another portion of the shaped blade root, a stud affixed to and substantially spanwisely extending from within the retention member, the stud further extending through an opening disposed between the spanwisely inner and outer surfaces of the retention plate, and a fastener disposed proximate to the spanwisely outer surface of the retention plate and capturing the extended stud end, wherein the tightened fastener releasably secures the shaped retention plate to the retention member through the affixed stud.

2. The system as claimed in claim 1, wherein the closed sides of the retention member form a continuous annulus.

3. The system as claimed in claim 1, wherein the flange is integral with the retention member.

4. The system as claimed in claim 1, wherein the shaped blade root is preloaded against and within its captivating retention member by a stud and fastener connection which urges the retention plate against the blade root and the retention member.

* * * * *